（12）United States Patent
Clark et al.

(10) Patent No.: US 7,464,537 B2
(45) Date of Patent: Dec. 16, 2008

(54) HEAT TRANSFER ENHANCEMENT FEATURES FOR A TUBULAR WALL COMBUSTION CHAMBER

(75) Inventors: Jim A. Clark, Jupiter, FL (US); Gregg W. Jones, Decatur, AL (US)

(73) Assignee: United Technologies Corporation, Hartford, CT (US)

( * ) Notice: Subject to any disclaimer, the term of this patent is extended or adjusted under 35 U.S.C. 154(b) by 694 days.

(21) Appl. No.: 11/098,065

(22) Filed: Apr. 4, 2005

(65) Prior Publication Data

US 2006/0219191 A1    Oct. 5, 2006

(51) Int. Cl.
 *F02K 11/00* (2006.01)
(52) U.S. Cl. .............................. 60/267; 60/759; 431/353
(58) Field of Classification Search .............. 123/41.72, 123/41.79, 195 R, 193.2; 122/511, 512; 110/325; 138/38, 39; 431/353; 60/267, 60/266, 257, 752–760
See application file for complete search history.

(56) References Cited

U.S. PATENT DOCUMENTS

| 710,130 | A | * | 9/1902 | Weiss | 60/39.48 |
|---|---|---|---|---|---|
| 813,918 | A | * | 2/1906 | Schmitz | 165/141 |
| 1,935,659 | A | * | 11/1933 | Noack | 122/24 |
| 2,179,638 | A | * | 11/1939 | Koppers | 48/67 |
| 2,275,555 | A | * | 3/1942 | Power | 239/420 |
| 2,446,059 | A | * | 7/1948 | Peterson et al. | 432/223 |
| 2,551,710 | A | * | 5/1951 | Slaughter | 362/355 |
| 2,844,939 | A | * | 7/1958 | Schultz | 60/257 |
| 2,930,405 | A | * | 3/1960 | Welsh | 138/38 |
| 3,062,566 | A | * | 11/1962 | Coburn | 60/266 |
| 3,064,425 | A | * | 11/1962 | Hayes | 60/756 |
| 3,066,702 | A | * | 12/1962 | Tumavicus | 138/111 |
| 3,069,850 | A | * | 12/1962 | Ledwith et al. | 60/229 |
| 3,127,737 | A | * | 4/1964 | Ledwith | 138/177 |
| 3,170,286 | A | * | 2/1965 | Stein | 60/267 |
| 3,177,935 | A | * | 4/1965 | Rosman | 165/169 |
| 3,190,070 | A | * | 6/1965 | Neu, Jr. | 60/267 |
| 3,224,678 | A | * | 12/1965 | Rosman | 239/127.1 |
| 3,235,947 | A | * | 2/1966 | Sohlemann | 29/890.01 |
| 3,267,563 | A | * | 8/1966 | Seaton | 29/890.036 |
| 3,267,564 | A | * | 8/1966 | Keyes | 29/890.036 |
| 3,349,464 | A | * | 10/1967 | Becker, Jr. et al. | 29/890.01 |
| 3,349,558 | A | * | 10/1967 | Smith | 60/754 |
| 3,589,128 | A | * | 6/1971 | Sweet | 60/757 |
| 3,690,103 | A | * | 9/1972 | Dederra et al. | 60/267 |
| 3,692,637 | A | * | 9/1972 | Dederra et al. | 205/114 |
| 3,713,293 | A | * | 1/1973 | Simon | 60/267 |
| 3,736,747 | A | * | 6/1973 | Warren | 60/732 |
| 3,750,709 | A | * | 8/1973 | French | 138/38 |
| 3,835,644 | A | * | 9/1974 | Butter et al. | 60/267 |
| 3,897,316 | A | * | 7/1975 | Huang | 29/455.1 |

(Continued)

*Primary Examiner*—William H Rodriguez
(74) *Attorney, Agent, or Firm*—Bachman & LaPointe, P.C.

(57) ABSTRACT

A combustion chamber for use in an engine, such as a rocket engine, has an inner wall with a corrugated configuration. The inner wall is formed with a plurality of tubes for carrying a coolant. As a result of the tubular construction, the inner wall has a plurality of spaced apart crowns and a plurality of valleys intermediate with the spaced apart crowns. To enhance the rate of heat flux or transfer in the valleys, a device is installed in each valley to cause local intensification of the turbulence in the hot gas flow in an effective way. The device may take the shape of a chevron or a bump.

19 Claims, 5 Drawing Sheets

U.S. PATENT DOCUMENTS

| | | | | |
|---|---|---|---|---|
| 3,978,662 A * | 9/1976 | DuBell et al. | | 60/757 |
| 4,044,797 A * | 8/1977 | Fujie et al. | | 138/38 |
| 4,236,378 A * | 12/1980 | Vogt | | 60/757 |
| 4,248,179 A * | 2/1981 | Bonner | | 122/235.14 |
| 4,288,980 A * | 9/1981 | Ernst | | 60/39.23 |
| 4,292,810 A * | 10/1981 | Glenn | | 60/757 |
| 4,425,942 A * | 1/1984 | Hage et al. | | 138/38 |
| 4,607,487 A * | 8/1986 | Tilston | | 60/752 |
| 4,703,620 A * | 11/1987 | Niino et al. | | 60/260 |
| 4,759,516 A * | 7/1988 | Grose | | 244/130 |
| 4,781,019 A * | 11/1988 | Wagner | | 60/260 |
| 4,821,797 A * | 4/1989 | Allgauer et al. | | 165/141 |
| 5,024,058 A * | 6/1991 | Shekleton et al. | | 60/752 |
| 5,052,476 A * | 10/1991 | Sukumoda et al. | | 165/133 |
| 5,055,032 A * | 10/1991 | Altemark et al. | | 431/158 |
| 5,070,937 A * | 12/1991 | Mougin et al. | | 165/133 |
| 5,154,139 A * | 10/1992 | Johnson | | 122/235.12 |
| 5,221,045 A * | 6/1993 | McAninch et al. | | 239/1 |
| 5,291,862 A * | 3/1994 | Katoh et al. | | 123/193.2 |
| 5,371,945 A * | 12/1994 | Schnoor | | 29/890.1 |
| 5,386,628 A * | 2/1995 | Hartman et al. | | 29/890.01 |
| 5,474,040 A * | 12/1995 | Murakami et al. | | 123/195 R |
| 5,557,928 A * | 9/1996 | Castro et al. | | 60/260 |
| 5,593,301 A * | 1/1997 | Garrison et al. | | 431/350 |
| 5,832,719 A * | 11/1998 | Riccardi | | 60/267 |
| 6,044,805 A * | 4/2000 | Walker et al. | | 122/512 |
| 6,123,110 A * | 9/2000 | Smith et al. | | 138/98 |
| 6,138,619 A * | 10/2000 | Etemad | | 123/41.74 |
| 6,138,630 A * | 10/2000 | Lazcano-Navarro | | 123/193.2 |
| RE37,114 E * | 3/2001 | Youngs et al. | | 405/52 |
| 6,530,225 B1 * | 3/2003 | Hadder | | 60/772 |
| 6,662,860 B2 * | 12/2003 | Iwamoto et al. | | 165/133 |
| 6,872,070 B2 * | 3/2005 | Moore et al. | | 431/9 |
| 6,883,220 B2 * | 4/2005 | Horn | | 29/421.1 |
| 6,920,750 B2 * | 7/2005 | Haggander et al. | | 60/267 |
| 7,044,210 B2 * | 5/2006 | Usui | | 165/177 |
| 7,104,067 B2 * | 9/2006 | Bunker | | 60/752 |
| 7,182,045 B2 * | 2/2007 | Harth, III | | 122/511 |
| 7,204,061 B2 * | 4/2007 | Terabe et al. | | 52/506.02 |
| 7,213,392 B2 * | 5/2007 | McMullen et al. | | 60/266 |
| 7,278,380 B2 * | 10/2007 | Matsutani et al. | | 123/41.74 |
| 7,299,551 B2 * | 11/2007 | McMullen et al. | | 29/890.01 |
| 7,347,041 B1 * | 3/2008 | McMullen et al. | | 60/266 |
| 2005/0072395 A1 * | 4/2005 | Bilger et al. | | 123/195 R |

* cited by examiner

HEAT TRANSFER ENHANCEMENT FEATURES FOR A TUBULAR WALL COMBUSTION CHAMBER

BACKGROUND OF THE INVENTION (1) Field of the Invention

The present invention relates to combustion chambers used for engines and to techniques for increasing or enhancing the rate of heat flux from a combustion chamber enclosed by walls comprised of tubes or pipes.

(2) Prior Art

As shown in FIG. 1A, most combustion chambers have smooth inner walls 2 with no provisions for increasing heat transfer from a flame to the wall. In contrast, as shown in FIGS. 1B and 1C, some combustion chambers have corrugated walls 4 comprised of a plurality of tubes or pipes 6, a configuration that adds surface area, thereby increasing heat transfer. The interior of the tubes 6 typically carries a coolant such as water or hydrogen. The purpose of the tubes 6 is threefold: (1) contain the flame; (2) transfer heat from combustion gases to the coolant; and (3) contain the coolant. Thus, the walls of the tubes 6 typically must be strong, conducive to heat transfer, and capable of withstanding high surface temperatures.

A vulnerability of corrugated wall constructions is that the crowns of the walls, i.e. the portions of the wall closest to the flame, typically operate at higher temperatures than the remainder of the wall. Thus, tubular wall combustion chambers must be designed to keep the crowns of the tubes well below the melting point of the tube material. This typically requires that the tubes be oriented so that they are parallel with the hot gas flow field in the combustion chamber, because other orientations could cause the flow field to tumble as it passes over each tube. Such tumbling could cause the tube crown to overheat. This design feature means that much of the tube wall facing the flame (especially the valley between adjacent tube crowns) operates well below its maximum temperature capability.

SUMMARY OF THE INVENTION

Accordingly, it is an object of the present invention to provide a tubular wall combustion chambers having enhanced heat transfer in the valley between adjacent tube crowns.

The following object is achieved by combustion chamber wall constructions of the present invention.

In accordance with the present invention, an improved combustion chamber for use in an engine, such as an expander-cycle rocket engine, is provided. The combustion chamber broadly comprises an inner wall structure having a corrugated configuration with a plurality of spaced apart crowns and a plurality of valleys intermediate with the spaced apart crowns. Means are provided in each of the valleys for enhancing the rate of heat flux or heat transfer. In a preferred embodiment of the present invention, the heat flux rate enhancing means comprises a chevron structure or a bump positioned in the valley.

Other details of the heat transfer enhancement features for tubular wall combustion chambers, as well as other objects and advantages attendant thereto, are set forth in the following detailed description and the accompanying drawings, wherein like reference numerals depict like elements.

DETAILED DESCRIPTION OF THE PREFERRED EMBODIMENT(S)

Figure 1A:
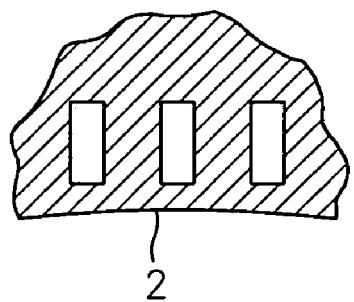
FIGS. 1A-1C show prior art combustion chamber wall constructions.
Figure 1B:
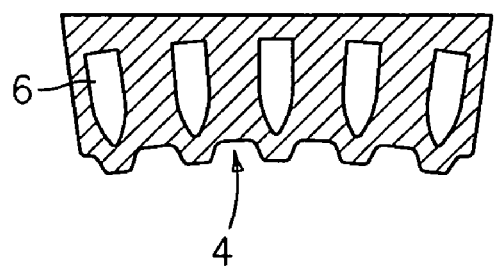
Figure 1C:
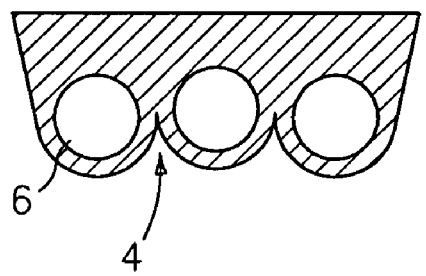
Figure 2:
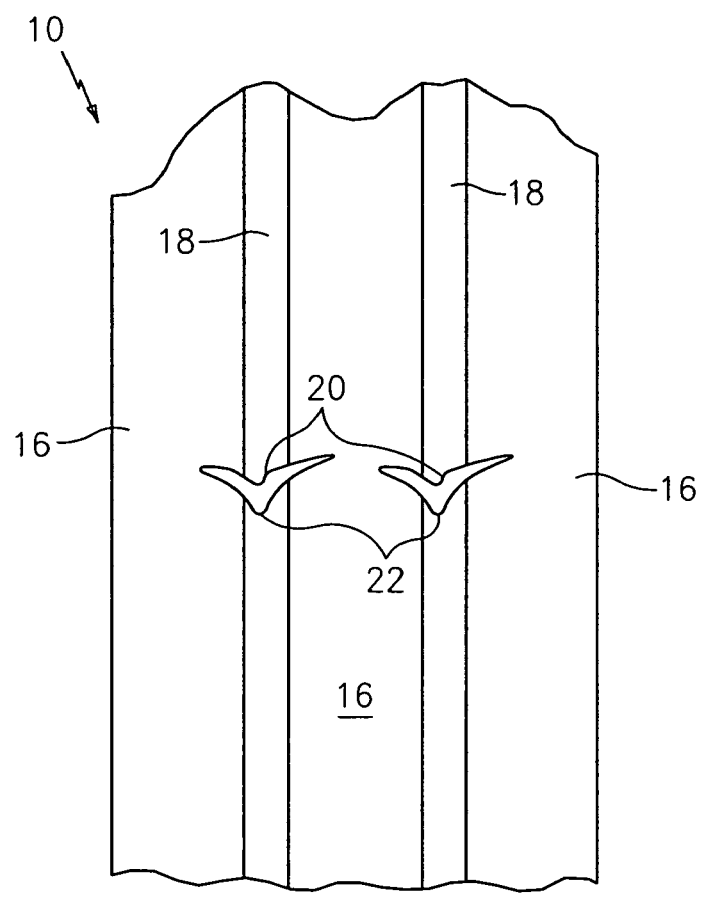
FIG. 2 shows a first embodiment of a combustion chamber inner wall in accordance with the present invention having a chevron structure for enhancing the rate of heat flux in adjacent valleys.
Figure 3:
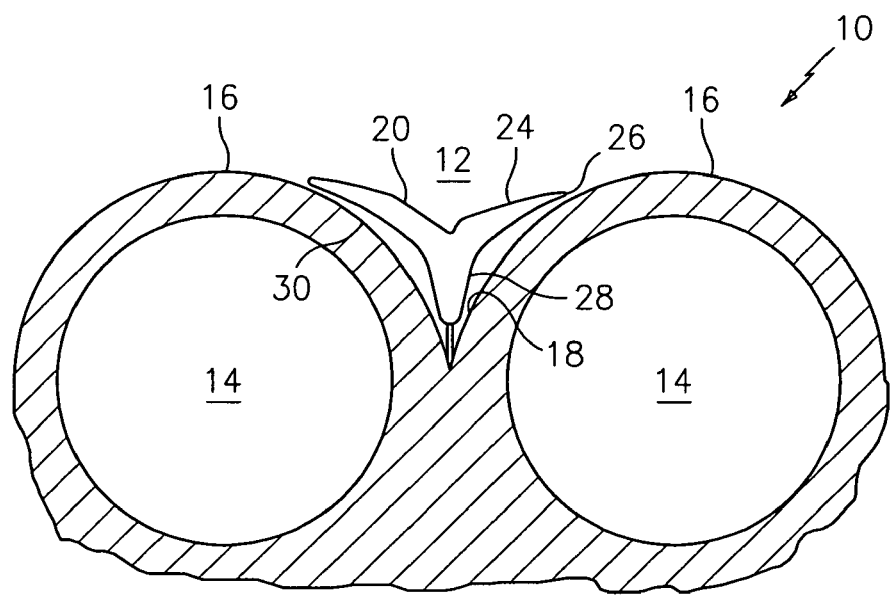
FIG. 3 is a front view of the chevron structure of FIG. 2.
Figure 4:
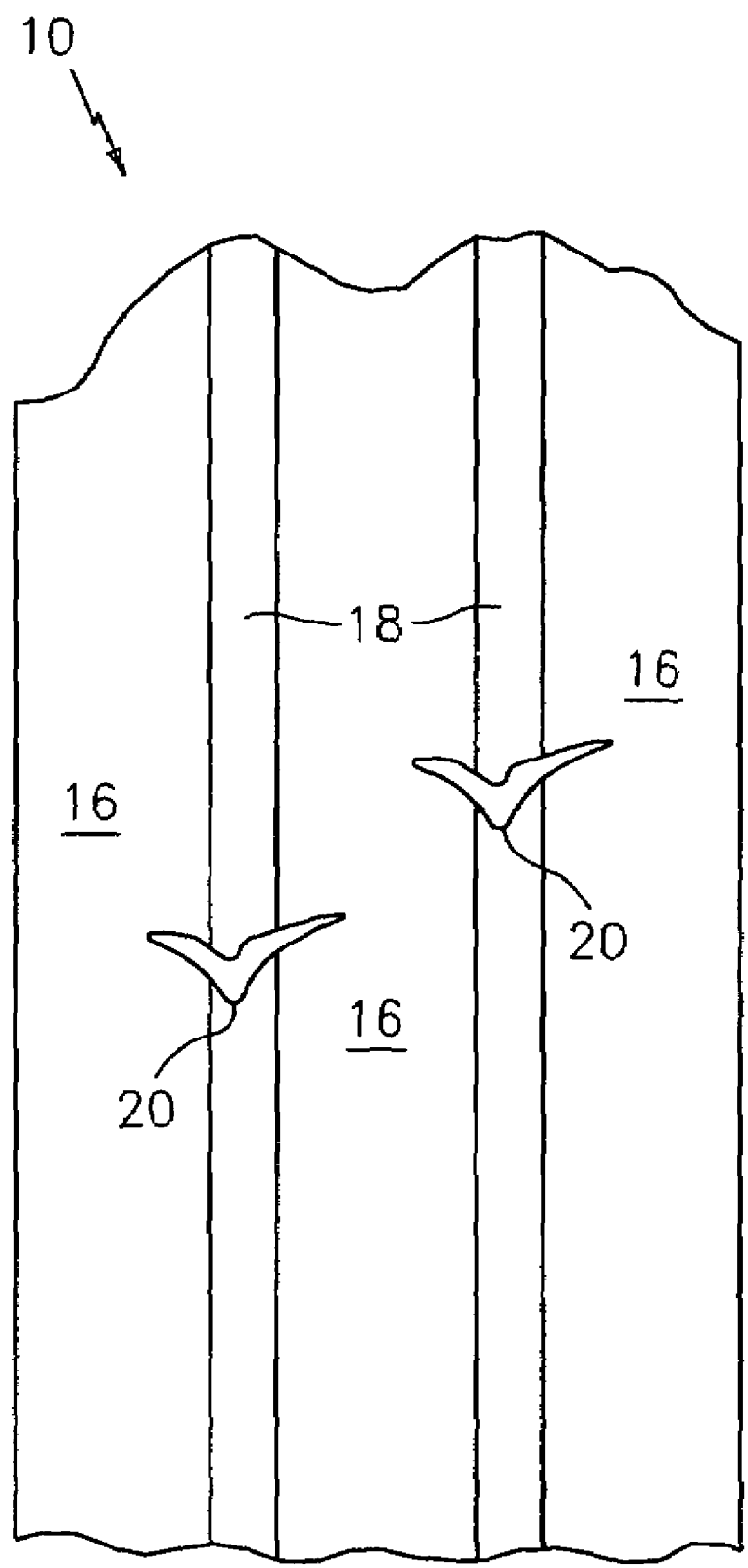
FIG. 4 is a view of a plurality of chevron structures in adjacent valleys in a staggered configuration.

Referring to FIGS. 2 through 4, there is shown a portion of an inner wall construction 10 of a combustion chamber 12 having a first embodiment of a mechanism for enhancing the rate of heat flux in accordance with the present invention. The inner wall construction 10 is formed by a plurality of joined or connected tubes or pipes 14 in which coolant flows. As can be seen from the figures, the inner wall construction 10 has a corrugated configuration. While only a portion of the inner wall 10 of the combustion chamber 12 has been shown, it should be recognized that the inner wall construction 10 completely encloses the space which is the combustion chamber 12. The inner wall construction 10 may be circular or non-circular in shape depending on the desired configuration of the combustion chamber 12.

The plurality of tubes or pipes 14 may be formed in the inner wall construction 10 in any suitable manner known in the art from any suitable heat conductive material known in the art such as copper or a copper alloy. The tubes or pipes 14 are typically integrally formed and thus are joined together. The tubes or pipes 14 are preferably oriented so that they are parallel with the hot gas flow field in the combustion chamber 12.

The inner wall construction 10 is characterized by a plurality of spaced apart crowns 16 and a plurality of valleys 18 intermediate with the spaced apart crowns 16. The crowns 16 are the portions of the inner wall 10 closest to the flame and operate at higher temperatures than the remainder of the inner wall 10.

In order to increase the ability of the entire inner wall 10 to operate at its maximum temperature capability, means are provided in each of the valleys 18 to enhance the heat flux or heat transfer in each valley 18. In the embodiment shown in FIGS. 2 through 4, the heat flux enhancing means comprises a chevron structure 20 formed from a heat conductive material such as machined copper or copper alloy. The chevron structure 20 is preferably V-shaped with its leading edge 22 being oriented in a direction parallel or substantially parallel to the hot gas flow field in the combustion chamber 12. Each chevron structure 20 is joined to a respective valley 18 using any suitable means known in the art such as a piece of heat conductive material.

Each chevron structure 20 preferably fills a respective valley 18. It is important that each chevron structure 20 be positioned so that its top surface 24 is lower than the adjacent crowns 16. This is needed to prevent the chevron structures 20 from melting. Each chevron structure 20 preferably has almost no height at its tips 26 and has its greatest height at its center 28. The middle or center 28 of each chevron structure 20 sits in the middle of a respective valley 18 between adjacent tubes 14. As can be seen from FIG. 3, the tips 26 of the chevron structure 20 rise up the sides 30 of the valley, pointing towards the crowns 16 of the tubes 14.

The height of each chevron structure 20 is important in that if there is too little height, the chevron structure 20 does not deliver significant heat transfer enhancement. If the chevron structure 20 is too high, as mentioned above, it may overheat and melt. While width is important, it is not as important as height in general. However, the chevron structure 20 should fill most of the valley 18.

Depending on combustion chamber geometry, the chevron structures 20 may be aligned as shown in FIG. 2 or they may be staggered about the circumference of the combustion chamber 12 as shown in FIG. 4. That is, adjacent ones of the chevron structures 20 may be aligned (see FIG. 2) or alternatively, adjacent ones of the chevron structures 20 may be staggered (see FIG. 4). If desired, some of the adjacent chevron structures may be aligned, while others may be staggered.

Figure 5:
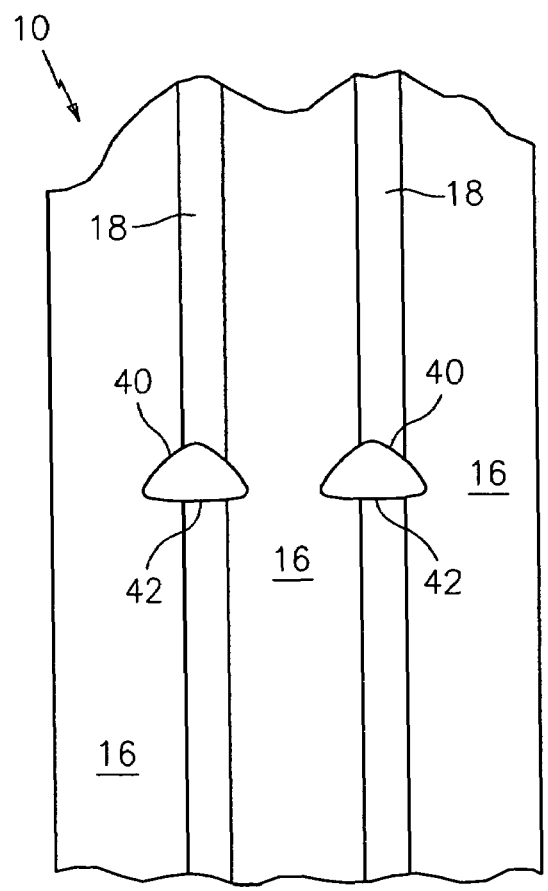
FIG. 5 shows a second embodiment of a combustion chamber wall in accordance with the present invention having a bump for enhancing the rate of heat flux in adjacent valleys.
Figure 6:
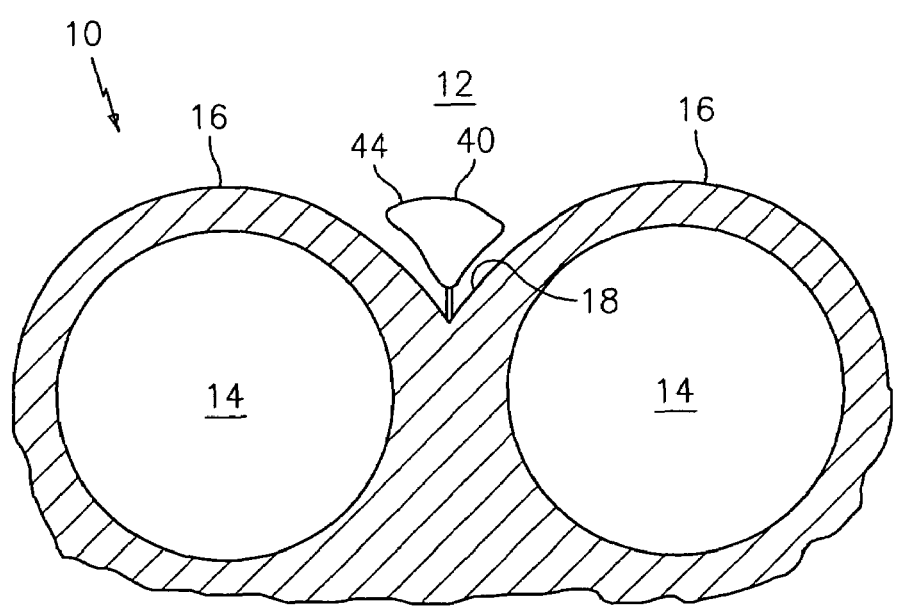
FIG. 6 is a front view of the bump configuration of FIG. 5.
Figure 7:
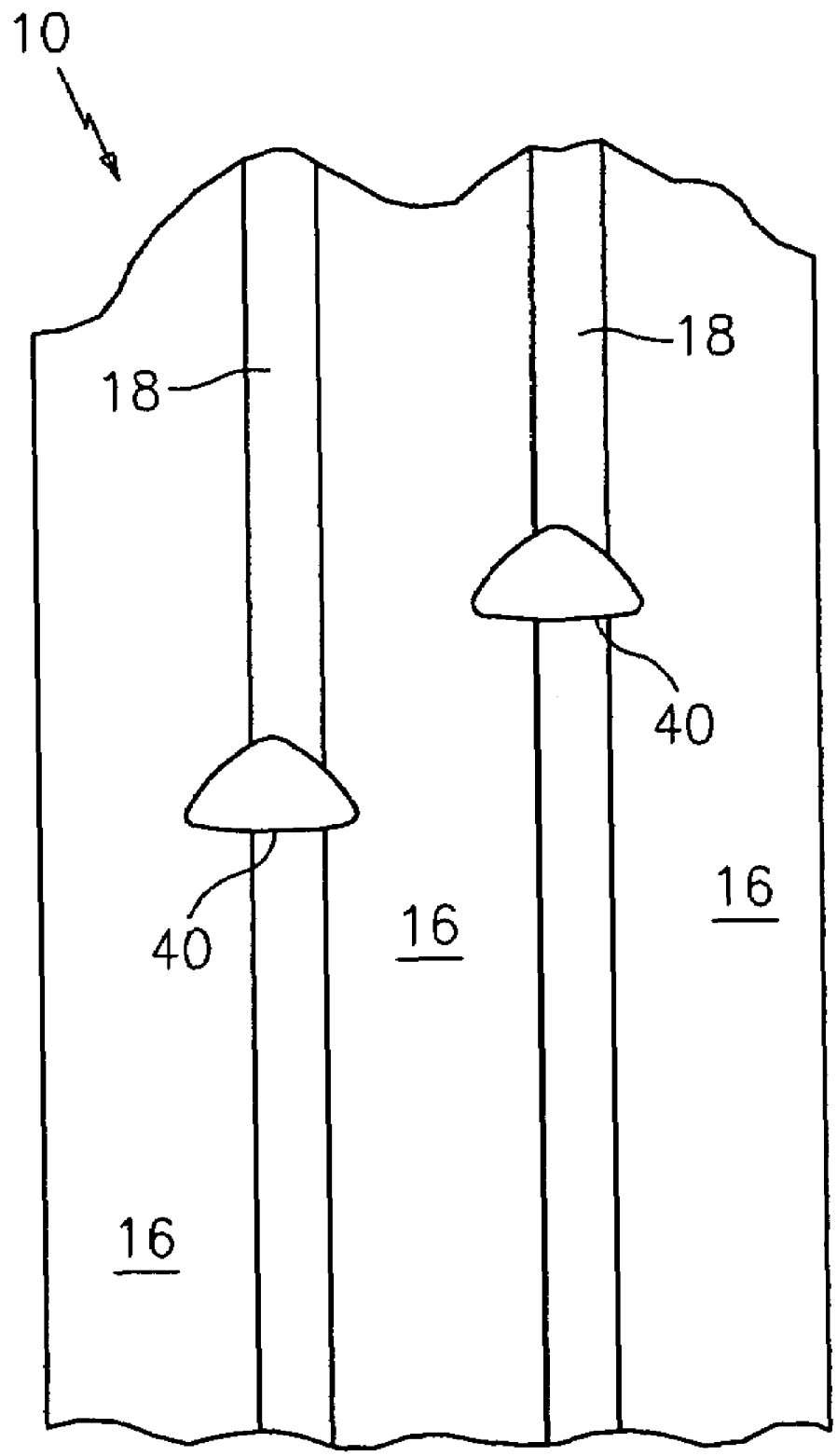
FIG. 7 is a view of a plurality of bumps in adjacent valleys in a staggered configuration.

Referring now to FIGS. 5 through 7, there is shown another embodiment of a heat transfer enhancement means in accordance with the present invention. In this embodiment, the heat transfer enhancement means are formed by a plurality of bumps 40. Each bump 40 is positioned so as to sit in a respective valley 18 and is formed by a half sphere structure with the flat side 42 facing downstream. As before, each bump 40 has a height which is sufficiently high to deliver significant heat-transfer enhancement. Further, the height is not so much that the bump 40 overheats and melts. Each bump 40 may be formed from any suitable heat conductive material known in the art, such as copper or a copper alloy, and may be attached to a respective valley 18 using any suitable means known in the art. Still further, each bump 40 has a top surface 44 and said top surface 44 is lower than adjacent ones of the crowns 16.

The bumps 40 in adjacent valleys 18 may be aligned around the circumference of the combustion chamber 12 as shown in FIG. 5. Alternatively, the bumps 40 may be staggered around the circumference of the combustion chamber 12 as shown in FIG. 7. Still further, the bumps 40 may be arranged in a combination of the foregoing. The arrangement which is utilized is a function of the geometry of the combustion chamber 12.

As discussed above, the hot gas flow field in the combustion chamber 12 is caused to tumble to enhance heat transfer effects. The tumbling has the effect of bringing the hottest portion of the flame (the part outside the boundary layer) in closer contact with the tubular wall 12. The use of the heat flux enhancing means, whether it be the chevron structures 20 or the bumps 40, causes local intensification of the turbulence in the valleys 18 in an effective way. The heat flux enhancing means cause a flow field near each respective valley to tumble without causing flow field tumbling near adjacent crowns.

Tests have indicated that the heat flux enhancement features described hereinbefore increase heat transfer by 15% to 30%. The tests consisted of benchtop tests with copper tubing and chevron structures or bumps made of machined copper. Cold air was passed through the tubes while hot air was caused to flow over the outside of the tubes and over chevron structures and bumps attached to the outside of the tubes. The test measured temperature rise of the cold air at various flow rates of hot air and cold air for various geometries of bumps and chevrons. The tests consistently showed that the bumps and chevron structures improve the heat transfer rate by 15% to 30%.

While the heat transfer enhancement means have been described as having the shape of a chevron or a half sphere, other shapes may be used if desired.

The combustion inner wall configurations described herein can be used for any combustion chamber for any engine known in the art. The configurations of the present invention have been found to have particular utility in combustion chambers for expander-cycle rocket engines having an inner wall construction 10 which includes a plurality of tubes or pipes 14 for carrying a coolant.

It is apparent that there has been provided in accordance with the present invention heat transfer enhancement features for tubular wall combustion chamber which fully satisfies the objects, means, and advantages set forth hereinbefore. While the present invention has been described in the context of specific embodiments thereof, other alternatives, modifications, and variations will become apparent to those skilled in the art having read the foregoing description. Accordingly, it is intended to embrace those alternatives, modifications, and variations as fall within the broad scope of the appended claims.

What is claimed is:

1. A combustion chamber for use in an engine, said combustion chamber comprising:
   an inner wall structure having a configuration with a plurality of spaced apart crowns and a plurality of valleys intermediate with said spaced apart crowns;
   means in each of said valleys for enhancing the rate of heat flux;
   said heat flux rate enhancing means comprising at least one body in the form of a bump placed in each said valley;
   each said bump body comprising a half sphere with a flat side facing upstream; and
   each said bump having bottom surfaces spaced from a surface of said inner wall structure.

2. The combustion chamber according to claim 1, wherein said heat flux rate enhancing means comprises means for causing a flow field near a respective valley to tumble without causing flow field tumbling near adjacent crowns.

3. The combustion chamber according to claim 1, wherein each said bump body has a height sufficient to deliver significant heat transfer enhancement but less than a height which causes the bump body to overheat and melt.

4. The combustion chamber according to claim 1, wherein adjacent ones of said bump bodies are aligned with each other.

5. The combustion chamber according to claim 1, wherein adjacent ones of said bump bodies are staggered with respect to each other.

6. The combustion chamber according to claim 1, wherein said inner wall structure is formed by a plurality of tubes.

7. The combustion chamber according to claim 6, wherein each of said tubes has a coolant flowing therethrough.

8. A combustion chamber for use in an engine, said combustion chamber comprising:
   an inner wall structure having a configuration with a plurality of spaced apart crowns and a plurality of valleys intermediate with said spaced apart crowns;
   means in each of said valleys for enhancing the rate of heat flux, and
   said heat flux rate enhancing means comprising at least one chevron shaped structure placed in each said valley.

9. The combustion chamber according to claim 8, wherein each said chevron shaped structure has a height sufficient to deliver significant heat transfer enhancement but less than a height which causes the structure to overheat and melt.

10. The combustion chamber according to claim 8, wherein each said chevron shaped structure has a top surface and said top surface is lower than adjacent ones of said crowns.

11. The combustion chamber according to claim 8, wherein each said chevron shaped structure has almost no height at its tips and has a greatest height at its center.

12. The combustion chamber according to claim 8, wherein each said chevron shaped structure has tips which rise up the sides of the valley in which said structure is placed towards the crowns.

13. The combustion chamber according to claim 8, wherein adjacent ones of said chevron shaped structures are aligned with each other.

14. The combustion chamber according to claim 8, wherein adjacent ones of said chevron shaped structures are staggered with respect to each other.

15. An engine comprising:
   a combustion chamber having an inner wall with a plurality of embedded tubes;
   said inner wall having a surface formed by a plurality of spaced apart crowns and a plurality of spaced apart valleys;
   means within each said valley for enhancing the heat transfer rate within the valley;
   said heat flux rate enhancing means comprising at least one body in the form of a bump placed in each said valley;
   each said bump body comprising a half sphere with a flat side facing upstream; and
   each said bump being spaced from a surface of said inner wall structure.

16. An engine comprising:
   a combustion chamber having an inner wall with a plurality of embedded tubes;
   said inner wall having a surface formed by a plurality of spaced apart crowns and a plurality of spaced apart valleys;
   means within each said valley for enhancing the heat transfer rate within the valley; and
   said heat transfer rate enhancing means comprising a chevron shaped structure in each said valley.

17. An engine according to claim 16, wherein each said heat transfer rate enhancing means substantially fills the valley in which it is positioned.

18. An engine according to claim 16, wherein each said heat transfer rate enhancing means has a height sufficient to deliver significant heat transfer enhancement but less than a height which causes the heat transfer rate enhancing means to overheat and melt.

19. An engine according to claim 16, wherein each said heat transfer rate enhancing means has a top surface and said top surface is lower than adjacent ones of said crowns.

\* \* \* \* \*